United States Patent
Sehlstedt

(10) Patent No.: US 12,002,477 B2
(45) Date of Patent: *Jun. 4, 2024

(54) METHODS FOR PHASE ECU F0 INTERPOLATION SPLIT AND RELATED CONTROLLER

(71) Applicant: Telefonaktiebolaget LM Ericsson (publ), Stockholm (SE)

(72) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,280

(22) Filed: May 30, 2023

(65) Prior Publication Data

US 2023/0298597 A1   Sep. 21, 2023

Related U.S. Application Data

(63) Continuation of application No. 17/430,001, filed as application No. PCT/EP2020/054520 on Feb. 20, 2020, now Pat. No. 11,705,136.

(Continued)

(51) Int. Cl.
*G10L 19/005* (2013.01)
*G06F 17/14* (2006.01)
(Continued)

(52) U.S. Cl.
CPC .......... *G10L 19/005* (2013.01); *G06F 17/142* (2013.01); *G10L 19/02* (2013.01);
(Continued)

(58) Field of Classification Search
CPC ..................................................... G10L 19/005
See application file for complete search history.

(56) References Cited

U.S. PATENT DOCUMENTS 5,673,363 A   9/1997   Jeon et al.
6,775,649 B1   8/2004   DeMartin
(Continued)

FOREIGN PATENT DOCUMENTS

EP   3125239 A1   2/2017
EP   3176781 A2   6/2017
(Continued)

OTHER PUBLICATIONS

International Search Report and Written Opinion of the International Searching Authority, PCT/EP2020/054520, mailed Jul. 7, 2020, 10 pages.

(Continued)

*Primary Examiner* — Shaun Roberts
(74) *Attorney, Agent, or Firm* — Sage Patent Group

(57) ABSTRACT

Controlling a concealment method for a lost audio frame associated with a received audio signal is provided. At least one bin vector of a spectral representation for at least one tone is obtained, wherein the at least one bin vector includes three consecutive bin values for the at least one tone. Whether each of the three consecutive bin values has a complex value or a real value is determined. Responsive to the determination, the three consecutive bin values are processed to estimate a frequency of the at least one tone based on whether each bin value has a complex value or a real value.

20 Claims, 10 Drawing Sheets

Related U.S. Application Data

(60) Provisional application No. 62/808,600, filed on Feb. 21, 2019, provisional application No. 62/808,587, filed on Feb. 21, 2019, provisional application No. 62/808,610, filed on Feb. 21, 2019.

(51) Int. Cl.
| | |
|---|---|
| *G10L 19/02* | (2013.01) |
| *G10L 25/18* | (2013.01) |
| *G10L 25/45* | (2013.01) |
| *H04L 65/75* | (2022.01) |
| *H04L 65/80* | (2022.01) |

(52) U.S. Cl.
CPC ...... *G10L 19/0204* (2013.01); *G10L 19/0212* (2013.01); *G10L 25/18* (2013.01); *G10L 25/45* (2013.01); *H04L 65/75* (2022.05); *H04L 65/80* (2013.01)

(56) References Cited

U.S. PATENT DOCUMENTS

| | | |
|---|---|---|
| 8,798,172 B2 | 8/2014 | Oh |
| 2008/0189100 A1 | 8/2008 | LeBlanc et al. |
| 2010/0241425 A1 | 9/2010 | Eksler et al. |
| 2010/0324911 A1 | 12/2010 | Jougit et al. |
| 2013/0144632 A1 | 6/2013 | Sung |
| 2015/0371641 A1 | 12/2015 | Bruhn |
| 2019/0005967 A1 | 1/2019 | Lecomte et al. |

FOREIGN PATENT DOCUMENTS

| | | |
|---|---|---|
| JP | 2016526703 A | 9/2016 |
| WO | 2014123469 A1 | 8/2014 |

OTHER PUBLICATIONS

3GPP TS 26.447 V15.0.0 (Jun. 2018), Release 15, pp. 58-62.

ETSI TS 126 445 V13.4.1 (Apr. 2017), Universal Mobile Telecommunications System (UMTS); LTE; Codec for Enhanced Voice Services (EVS); Detailed algorithmic description (3GPP TS 26.445 version 13.4.1 Release 13), 661 pages.

ETSI TS 103 634 V0.1.1 (Jun. 2019), Digital Enhanced Cordless Telecommunications (DECT); Low Complexity Communication Codec Plus (LC3plus); XP14345925A, 152 pages.

"Digital Enhanced Cordless Telecommunications (DECT); Low Complexity Communication Codec Plus (LC3plus)," ETSI TS 103 634 V0.1.1 (Jun. 2019), Jun. 2019, 8 pages.

Allie et al., "A Root of Less Evil", IEEE Signal Processing Magazine, Mar. 2005, pp. 93-96.

Examination Report for Indian Patent Application No. 202117027786, mailed Feb. 28, 2022, 4 pages.

Japanese Office Action; Reasons for Rejections, 2021-547687, mailed Sep. 22, 2022, 3 pages.

Jacobsen, et al. "Fast, Accurate Frequency Estimators," IEEE Signal Processing Magazine, May 2007, 4 pages.

| $f_s$ sampling frequency Hz | $L_{fade}$ |
|---|---|
| 8000 | 24 |
| 16000 | 48 |
| 24000 | 72 |
| 32000 | 96 |
| 44100, 48000 | 144 |

Figure 10

| $f_s$ Hz | $L_{rect}$ |
|---|---|
| 8000 | 80 |
| 16000 | 160 |
| 24000 | 240 |
| 32000 | 320 |
| 44100, 48000 | 480 |

Figure 11

METHODS FOR PHASE ECU F0 INTERPOLATION SPLIT AND RELATED CONTROLLER

CROSS REFERENCE TO RELATED APPLICATIONS

This application claims priority to U.S. patent application Ser. No. 17/430,001, filed on Aug. 11, 2021, which is a 35 U.S.C. § 371 national stage application of PCT International Application No. PCT/EP2020/054520 filed on Feb. 20, 2020, which claims the benefit of U.S. Provisional Application No. 62/808,587, filed on Feb. 21, 2019, U.S. Provisional Patent Application No. 62/808,600, filed on Feb. 21, 2019, and U.S. Provisional Application No. 62/808,610, filed on Feb. 21, 2019 the disclosures and contents of which are incorporated by reference herein in their entireties.

TECHNICAL FIELD

The present disclosure relates generally to a method for controlling a concealment method for a lost audio frame. The present disclosure also relates to a controller configured to control a concealment method for a lost audio frame of a received audio signal.

BACKGROUND

Transmission of speech/audio over modern communications channels/networks is mainly done in the digital domain using a speech/audio codec. This may involve taking the analog signal and digitalizing it using sampling and analog to digital converter (ADC) to obtain digital samples. These digital samples may be further grouped into frames that contain samples from a consecutive period of 10-40 ms depending on the application. These frames may then be processed using a compression algorithm, which reduces the number of bits that needs to be transmitted and which may still achieve as high quality as possible. The encoded bit stream is then transmitted as data packets over the digital network to the receiver. In the receiver, the process is reversed. The data packets may first be decoded to recreate the frame with digital samples which may then be inputted to a digital to analog converter (DAC) to recreate the approximation of the input analog signal at the receiver. FIG. 1 provides an example of a block diagram of an audio transfer using audio encoder and decoder over a network, such as a digital network, using the above-described approach.

When the data packets are transmitted over the network there can be data packets that may either be dropped by the network due to traffic load or dropped as a result of bit errors making the digital data invalid for decoding. When these events happen, the decoder needs to replace the output signal during periods where it is impossible to do the actual decoding. This replacement process is typically called frame/packet loss concealment (PLC). FIG. 2 illustrates a block diagram of a decoder 200 including packet loss concealment. When a Bad Frame Indicator (BFI) indicates lost or corrupted frame, PLC 202 may create a signal to replace the lost/corrupted frame. Otherwise, i.e., when BFI does not indicate lost or corrupted frame, the received signal is decoded by a stream decoder 204. A frame erasure may be signalled to the decoder by setting the bad frame indicator variable for the current frame active, i.e., BFI=1. The decoded or concealed frame is then input to DAC 206 to output an analog signal. Frame/packet loss concealment may also be referred to as error concealment unit (ECU).

There are numerous ways of doing packet loss concealment in a decoder. Some examples are replacing the lost frame with silence and repeating the last frame (or decoding of the last frame parameters). Other approaches try to replace the frame with the most likely continuation of the audio signal. For noise like signals, one approach may generate noise with a similar spectral structure. For tonal signals, one may first estimate the characteristics of present tones (frequency, amplitude, and phase) and use these parameters to generate a continuation of the tones at the corresponding temporal locations of lost frames.

Another approach for an ECU is the Phase ECU, described in 3GPP TS 26.477 V15.0.0 clause 5.4.3.5 and WO2014/123471A1, where the decoder may continuously save a prototype of the decoded signal during normal decoding. This prototype may be used in case of a lost frame. The prototype is spectrally analyzed, and the noise and tonal ECU functions are combined in the spectral domain. The Phase ECU identifies tones in the spectrum and calculates a spectral temporal replacement of related spectral bins. The other bins (non-tonal) may be handled as noise and are scrambled to avoid tonal artifacts in these spectral regions. The resulting recreated spectrum is inverse FFT (fast Fourier transform) transformed into time domain and the signal is processed to create a replacement of the lost frame. When the audio codec is based on modified discrete cosine transform (MDCT), the creation of the replacement includes the windowing, TDA (Time Domain aliasing) and ITDA (Inverse TDA) related to lapped MDCT to create an integrated continuation of the already decoded signal. This method may ensure continued use of MDCT memory and creation of MDCT memory that is to be used when normal decoding is to be resumed. The first correctly decoded frame in the transition from PLC to normal operation is also known as the first good frame. FIG. 3 illustrates a time alignment and signal diagram of Phase ECU and recreation of the signal from a PLC prototype. FIG. 3 also shows the timing relation between the encoder (top after encoder input) and in the decoder (second line after Decoder synthesis) at the point of the first lost frame in the decoder. It also illustrates how the Phase ECU time advanced recreated signal is positioned and used to continue using windowing TDA, ITDA and synthesis windowing to recreate the missing frame segment and transform memory.

SUMMARY

Tone location may be made in two operations using spectrally analysis on the PLC prototype buffer. After windowing and FFT, a first operation may be to locate the bins where tones may be located using the magnitude spectrum. A second operation may be to refine these estimates by interpolation and thereby may be get an increased accuracy, in the form of a fractional offset value. The resolution of the frequency estimation depends on two things. First, the length of the transform—longer transform may give higher resolution. Second, different interpolation methods may have different accuracy. For example, in operations discussed in international patent application publication no. WO2014/123469 for shorter frames (10 ms), the accuracy may not be good enough. For a higher-quality error concealment, high accuracy may be needed for the frequency estimation. While, just increasing the buffer length may be one solution, the complexity would increase too much. Most sensitive are clean sinus tones where interpolation error introduces frame wise discontinuities that are clearly audible and degrades the quality of the reconstructed signal. For longer bursts, even small errors may result in audible discontinuity during the transition back to decoded content.

According to some embodiments of inventive concepts, methods are provided to operate a controller for controlling a concealment method for a lost audio frame associated with a received audio signal. In such methods, the controller may obtain at least one bin vector of a spectral representation for at least one tone, wherein the at least one bin vector includes three consecutive bin values for the at least one tone. The controller may determine whether each of the three consecutive bin values has a complex value or a real value. Responsive to the determination, the controller may process the three consecutive bin values to estimate a frequency of the at least one tone based on whether each bin value has a complex value or a real value.

One advantage that may be obtained is a reduction of clicks in clean tones at the frame boundaries may occur. Transition back to decoded content after error bursts also may improve; and there may be a reduction in complexity from the magnitude approximation.

According to some embodiments of inventive concepts, responsive to determining that each of the three consecutive bin values for the at least one tone has a complex value the controller may: extract a complex value coefficient for each of the three consecutive bin values; calculate a fractional bin offset for the one tone based on the complex valued coefficient of each of the three consecutive bin values; and calculate a bin frequency for the one tone based on the fractional bin offset. Responsive to determining that at least one of the three consecutive bin values has a real value, the controller may: extract a magnitude point for each of the three consecutive bin values; calculate the fractional bin offset for the at least one tone based on the magnitude point of each of the three consecutive bin values; and calculate the bin frequency for the at least one tone based on the fractional bin offset.

According to some embodiments of inventive concepts, an apparatus for controlling a concealment method for a lost audio frame associated with a received audio signal is provided. The apparatus performs operations including obtaining at least one bin vector of a spectral representation for at least one tone, wherein the at least one bin vector includes three consecutive bin values for the at least one tone. The apparatus performs further operations including determining whether each of the three consecutive bin values has a complex value or a real value. The apparatus performs further operations including responsive to the determination, processing the three consecutive bin values to estimate a frequency of the at least one tone based on whether each bin value has a complex value or a real value.

According to some embodiments of inventive concepts, a computer program comprising program code to be executed by at least one processor of a decoder for controlling a concealment method for a lost audio frame associated with a received audio signal is provided. Execution of the program code causes the decoder to perform operations including obtaining at least one bin vector of a spectral representation for at least one tone, wherein the at least one bin vector includes three consecutive bin values for the at least one tone. Execution of the program code causes the decoder to perform further operations including determining whether each of the three consecutive bin values has a complex value or a real value. Execution of the program code causes the decoder to perform further operations including responsive to the determination, processing the three consecutive bin values to estimate a frequency of the at least one tone based on whether each bin value has a complex value or a real value.

According to some embodiments of inventive concepts, a computer program product comprising a non-transitory storage medium including program code to be executed by at least one processor of a decoder for controlling a concealment method for a lost audio frame associated with a received audio signal. Execution of the program code causes the decoder to perform operations including obtaining at least one bin vector of a spectral representation for at least one tone, wherein the at least one bin vector includes three consecutive bin values for the at least one tone. Execution of the program code causes the decoder to perform further operations including determining whether each of the three consecutive bin values has a complex value or a real value. Execution of the program code causes the decoder to perform further operations including responsive to the determination, processing the three consecutive bin values to estimate a frequency of the at least one tone based on whether each bin value has a complex value or a real value.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 10 illustrates that length of a copy part depends on the sampling frequency in accordance with some embodiments of inventive concepts.

FIG. 11 illustrates that length of a hamming part depends on the sample frequency in accordance with some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 13:
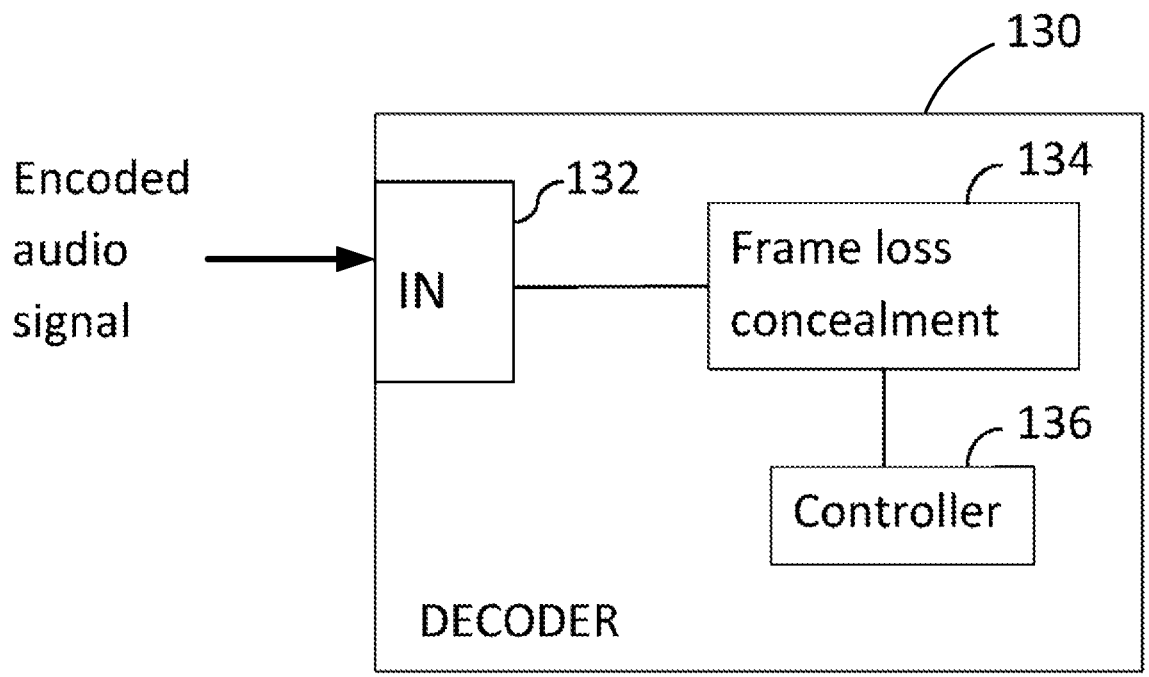
FIGS. 13-15 are block diagrams of a decoder including a controller according to some embodiments of inventive concepts.
Figure 14:
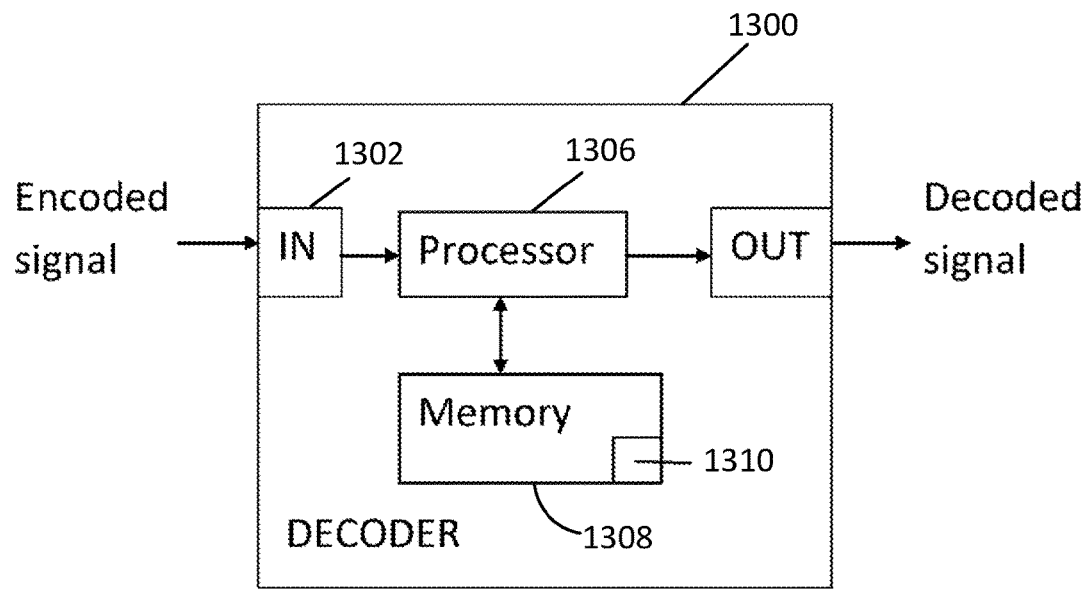
Figure 15:
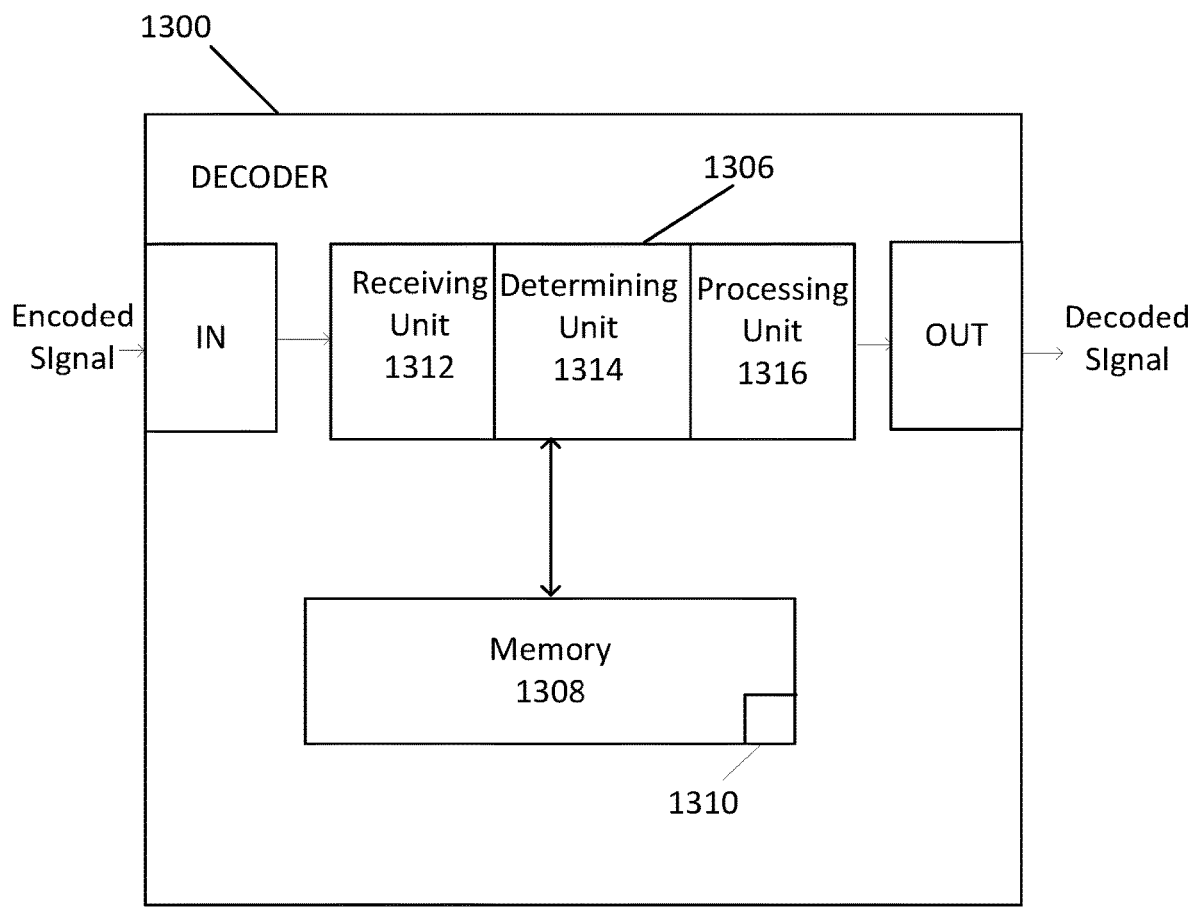

Various embodiments apply to a controller in a decoder, as illustrated in FIGS. 13-15. FIG. 13 is a schematic block diagram of a decoder according to some embodiments. The decoder 1300 comprises an input unit 1302 configured to receive an encoded audio signal. FIG. 13 illustrates frame loss concealment by a logical frame loss concealment-unit 1304, which indicates that the decoder is configured to implement a controller for concealment of a lost audio frame, according to various embodiments described herein. Further, decoder 1300 comprises a controller 1306 (also referred to herein as a processor or processor circuit) for implementing various embodiments described herein. Controller 1306 is coupled to the input (IN) and a memory 1308 (also referred to herein as a memory circuit) coupled to the processor 1306. The decoded and reconstructed audio signal obtained from processor 1306 is output from the output (OUT). The memory 1308 may include computer readable program code 1310 that when executed by the processor 1306 causes the processor to perform operations according to embodiments disclosed herein. According to other embodiments, processor 1306 may be defined to include memory so that a separate memory is not required.

The application of a sinusoidal model in order to perform a frame loss concealment operation may be described as follows:

In case a given segment of the coded signal cannot be reconstructed by the decoder since the corresponding encoded information is not available, i.e., since a frame has been lost, an available part of the signal prior to this segment may be used as prototype frame, where the prototype frame may be longer than a single frame. If y(n) with n=0 ... N−1 is the unavailable segment for which a substitution frame z(n) has to be generated, and y(n) with n<0 is the available previously decoded signal, a prototype frame of the available signal of length L and start index $n_{-1}$ is extracted with a window function w(n) and transformed into frequency domain, e.g. by means of DFT:

$$Y_{-1}(m) = \sum_{n=0}^{L-1} y(n-n_{-1}) \cdot w(n) \cdot e^{-j\frac{2\pi}{L}nm}$$

In various embodiments, the end of the decoded signal is used as the prototype frame. In such situations, y(n) becomes y(n) with n=L ... N−1. The above equation becomes:

$$Y_{-1}(m) = \sum_{n=0}^{L-1} y(n-L) \cdot w(n) \cdot e^{-j\frac{2\pi}{L}nm}$$

The window function can be one of the window functions described in more detail below in the sinusoidal analysis. For example, as described below, the window function may combine a rectangular window with tapering based on the Hamm window. Preferably, in order to save numerical complexity, the frequency domain transformed frame should be identical with the one used during sinusoidal analysis, which means that the analysis frame and the prototype frame will be identical, and likewise their respective frequency domain transforms.

In a next step the sinusoidal model assumption is applied. According to the sinusoidal model assumption, the DFT of the prototype frame can be written as follows:

$$Y_{-1}(m) = \frac{1}{2}\sum_{k=1}^{K} a_k \cdot \left( \left( W\left(2\pi\left(\frac{m}{L} + \frac{f_k}{f_s}\right)\right) \right) \cdot e^{-j\varphi_k} + W\left(2\pi\left(\frac{m}{L} - \frac{f_k}{f_s}\right)\right) \cdot e^{j\varphi_k} \right)$$

Next, it is realized that the spectrum of the used window function has only a significant contribution in a frequency range close to zero. The magnitude spectrum of the window function is large for frequencies close to zero and small otherwise (within the normalized frequency range from −π to π, corresponding to half the sampling frequency). Hence, as an approximation it is assumed that the window spectrum W (m) is non-zero only for an interval M=[−$m_{min}$, $m_{max}$], with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e., from one shifted window spectrum. This means that the expression above reduces to the following approximate expression:

$$\hat{Y}_{-1}(m) = \frac{a_k}{2} \cdot W\left(2\pi\left(\frac{m}{L} - \frac{f_k}{f_s}\right)\right) \cdot e^{j\varphi_k}$$

for non-negative m∈ $M_k$ and for each k. Herein, $M_k$ denotes the integer interval $$M_k = \left[\text{round}\left(\frac{f_k}{f_s} \cdot L\right) - m_{min,k}, \text{round}\left(\frac{f_k}{f_s} \cdot L\right) + m_{max,k}\right],$$

where $m_{min,k}$ and $m_{max,k}$ fulfill the above explained constraint such that the intervals are not overlapping. A suitable choice for $m_{min,k}$ and $m_{max,k}$ is to set them to a small integer value δ, e.g., δ=3. If however the DFT indices related to two neighboring sinusoidal frequencies $f_k$ and $f_{k+1}$ are less than 2δ, then δ is set to floor $$\left( \frac{\text{round}\left(\frac{f_{k+1}}{f_s} \cdot L\right) - \text{round}\left(\frac{f_k}{f_s} \cdot L\right)}{2} \right)$$

such that it is ensured that the intervals are not overlapping. The function floor(•) is the closest integer to the function argument that is smaller or equal to it.

Next, the sinusoidal model is applied according to the above expression and to evolve its K sinusoids in time. The assumption that the time indices of the erased segment compared to the time indices of the prototype frame differs by $n_{-1}$ samples means that the phases of the sinusoids advance by $$\theta_k = 2\pi \cdot \frac{f_k}{f_s} \cdot \text{time\_offs where time}_{\mathit{offs}} = t_{adv} + N(\text{burst}_{len} - 1)$$

where $\text{time}_{\mathit{offs}}$ is a time offset, $t_{adv}$ is a time advance, and $N(\text{burst}_{len}-1)$ is a timing adjustment based on the number of consecutive errors. The recreated frame is centered over the missed frame (hence the use of t_adv to center the recreated frame). For consecutive errors, the decoder needs to keep track of how many frames have been lost and adjust the offset accordingly (hence the use of N (burst$_{len}$-1). Hence, the DFT spectrum of the evolved sinusoidal model is given by:

$$Y_0(m) = \frac{1}{2}\sum_{k=1}^{K} a_k \cdot \left(\left(W\left(2\pi\left(\frac{m}{L} + \frac{f_k}{f_s}\right)\right) \cdot e^{-j(\varphi_k + \theta_k)} + W\left(2\pi\left(\frac{m}{L} - \frac{f_k}{f_s}\right)\right) \cdot e^{j(\varphi_k + \theta_k)}\right)\right)$$

Applying again the approximation according to which the shifted window function spectra do no overlap gives:

$$\hat{Y}_0(m) = \frac{a_k}{2} \cdot W\left(2\pi\left(\frac{m}{L} - \frac{f_k}{f_s}\right)\right) \cdot e^{j(\phi_k + \theta_k)}$$

for non-negative $m \in M_k$ and for each k.

Comparing the DFT of the prototype frame $Y_{-1}(m)$ with the DFT of evolved sinusoidal model $Y_0(m)$ by using the approximation, it is found that the magnitude spectrum remains unchanged while the phase is shifted by $$\theta_k = 2\pi \cdot \frac{f_k}{f_s} n_{-1},$$

for each $m \in M_k$.

Hence, the substitution frame can be calculated by the following expression:

$$z(n) = \text{IDFT}\{Z(m)\} \text{ with } Z(m) = Y(m) \cdot e^{j\Theta_k}$$

for non-negative $m \in M_k$ and for each $k$.

The size of the intervals $M_k$ in response to the tonality the signal may be adapted. Controller 1306 may receive a plurality of bin vectors of a spectral representation for at least one tone. Each bin vector includes three consecutive bin values for one tone. Controller 1306 may determine whether each of the three consecutive bins has a complex value or a real value. Responsive to the determination, controller 1306 may process the three consecutive bin values to estimate a frequency of the at least one tone. Receiving may be performed by a receiving unit 1312, determining may be performed by a determining unit 1314, and processing may be performed by a processing unit 1316 as illustrated in FIG. 15. Signals to be processed by processor 1306, including receiving unit 1312, determining unit 1314 and processing unit 1316 may be provided from memory 1308 as illustrated in FIG. 15.

The decoder with its processor 1306 may be implemented in hardware. There are numerous variants of circuitry elements that can be used and combined to achieve the functions of the units of the decoder. Such variants are encompassed by the various embodiments. Particular examples of hardware implementation of the decoder is implementation in digital signal processor (DSP) hardware and integrated circuit technology, including both general-purpose electronic circuitry and application-specific circuitry.

Tone location may be made in two operations using spectrally analysis on the PLC prototype buffer. After windowing and FFT, a first operation may be to locate the bins where tones may be located using the magnitude spectrum. A second operation may be to refine these estimates by interpolation and thereby may be get an increased accuracy, in the form of a fractional offset value. The resolution of the frequency estimation depends on two things. First, the length of the transform—longer transform may give higher resolution. Second, different interpolation methods may have different accuracy. For example, in operations discussed in international patent application publication no. WO2014/123469 for shorter frames (10 ms), the accuracy may not be good enough. For a higher-quality error concealment, high accuracy may be needed for the frequency estimation. While, just increasing the buffer length may be one solution, the complexity would increase. Most sensitive are clean sinus tones where interpolation error introduces frame wise discontinuities that are clearly audible and degrades the quality of the reconstructed signal. For longer bursts, even small errors may result in audible discontinuity during the transition back to decoded content.

Additionally, the use of magnitude spectrum for both the tone locator and current interpolator uses the square root function, which is a complex function. To reduce the complexity, it may be better to use a magnitude approximation function instead.

Some embodiments of the present disclosure of inventive concepts may use an interpolation method controller that may make it possible to use a different interpolation method according to the available FFT coefficients, which may increase accuracy with a limited increase in complexity. Some embodiments may also use magnitude approximation that lowers the complexity of calculating the magnitude spectrum for the tone locator and also may be used by parabolic interpolation.

For complexity reduction, a lower complexity magnitude approximation unit may be used. Operations for a similar lower complexity magnitude approximation unit are discussed M Allie and R Lyons, "A Root of Less Evil", IEEE Signal Processing Magazine, pp 93-96, Marsh, 2005 ("Allie"), with no loss of frequency resolution.

Some embodiments of the present disclosure of inventive embodiments, may improve interpolation accuracy and may increase the quality of the recreated signal from the Phase ECU. Additionally, with improved quality a shorter PLC buffer may be used and maintain quality which may be used for complexity reductions, e.g., the FFT and IFFT may be the major computations and may become costly for long buffers.

An apparatus for increased frequency resolution may include two additional units. A first unit may control which method is used for the frequency interpolation: either an interpolation unit which uses absolute values of the bin data (see e.g., similar operations discussed in in international patent publication no. WO2014/123469A1) may be used, or a second unit may be used where frequency interpolation is made using complex bin values.

Frequency analysis of the prototype buffer using windowing and FFT of $N_{FFT}$ samples produces a spectral representation with $$\frac{N_{FFT}}{2}+1$$

values, W(n) for n=0, ... $N_{FFT}/2$. Where n=0 represents DC and $$n = \frac{N_{FFT}}{2}$$

represents half the sampling frequency (fs). Of these all but two are complex values, the endpoints (DC and fs/2) are real only. Accuracy may therefore be increased if another interpolation method may be used that utilizes the available complex coefficients.

An interpolation method described in international patent publication no. WO2014/123469A1 uses one bin on each side on the identified tone location. Also, at the endpoints the interpolation method discussed in international patent publication no. WO2014/123469A1 still uses three bins, with an additional flag set to indicate that the identified peak is not at the middle location. In some embodiments of inventive concepts, an additional control unit may ensure that for peaks where all three bins have complex values it calls the new interpolation unit instead of an interpolation unit that uses absolute values of bin data for an improved frequency estimation. An interpolation unit that uses absolute values of bin data may be used in the cases where the bin 0 or $N_{FFT}/2$ bins are included in the three point interpolation data, also here the additional flag is set if the peak is not located in the middle bin.

After processing by the interpolation unit, bin values may be updated according to the found tone locations (phase adjustment of the tone and surrounding bins) and the scrambling of the non-tone location is continued. See e.g., similar operations discussed in international patent publication no. WO2014/123469A1.

In some embodiments of inventive concepts, a MDCT may be taken over a 20 ms window with a 10 ms advance. A PLC prototype frame saved after good frames is 16 ms in length. A related transient detector uses two short FFT with length 4 ms—that is one quarter of the PLC prototype frame. The actual length of these items depends on the sampling frequency used and may be from 8 kHz to 48 kHz. These lengths affect the number of spectral bins in each transform.

Spectral analysis and initial tone location are made using operations similar to those discussed in international patent publication no. WO2014/123469A1. Some embodiments of inventive concepts use magnitude approximation for lower complexity. The calculation of the magnitude spectrum of complex spectral estimates discussed in international patent publication no. WO2014/123469A1 involves the use of the square root function. For example, in international patent publication no. WO2014/123469A1, a complex number x=a+ib the magnitude of x may be calculated as:

$$|x| = \sqrt{a^2+b^2}. \quad (1)$$

Figure 5:
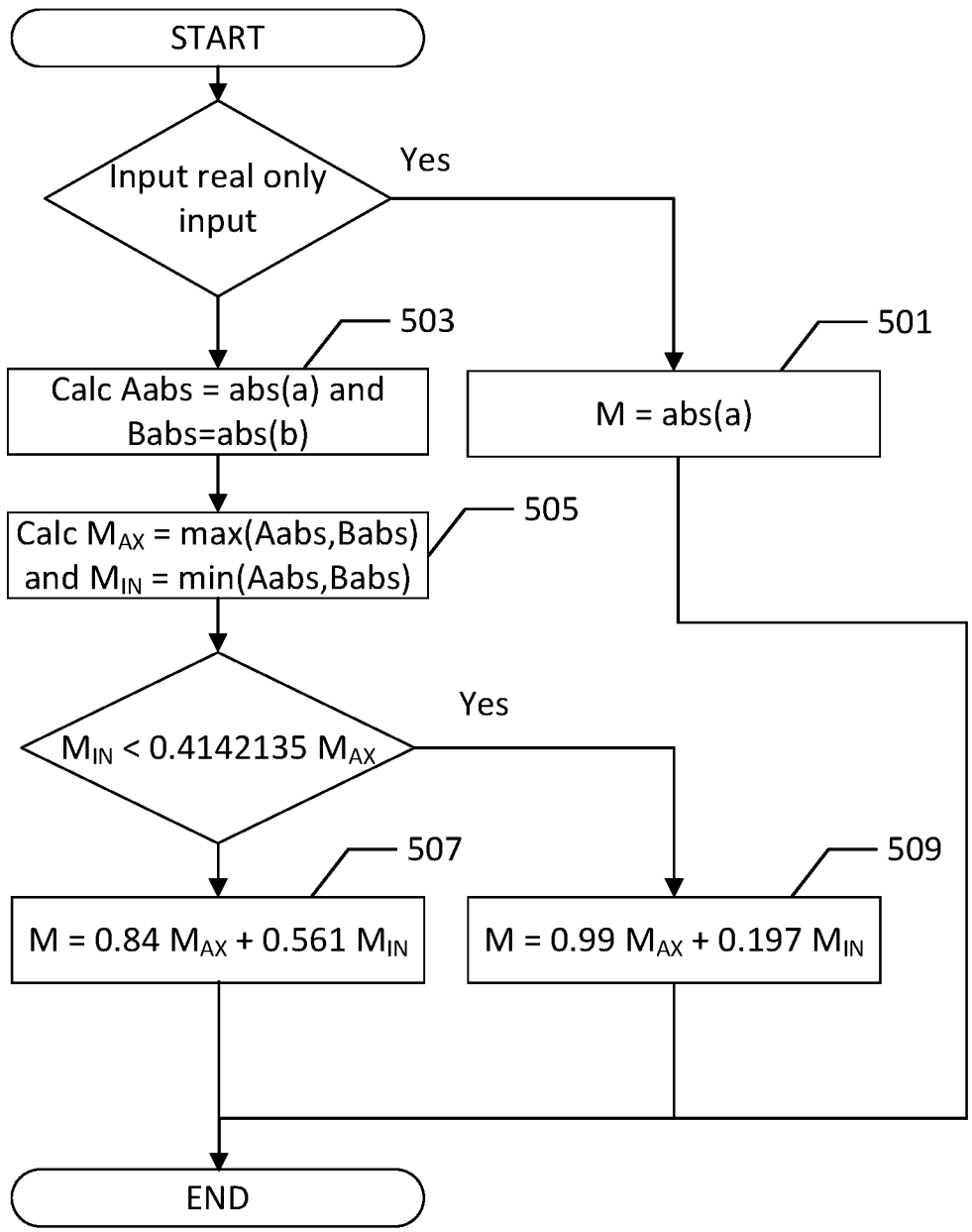
FIG. 5 is a flowchart of square root free linear approximation of magnitude spectrum.

In some embodiments of inventive concepts, a lower complexity approximation that uses a linear approximation is used. Similar operations for a lower complexity approximation are discussed in M. Allie and R. Lyons, "A Root of Less Evil", IEEE Signal Processing Magazine, pp 93-96, Marsh, 2005 (Allie). Turning to FIG. 5, while the first bin (0) and the last bin $$\left(\frac{N_{FFT}}{2}\right)$$

in the spectral estate from the FFT W(n) are real, the approximation takes the absolute value of those two in block 501. For complex spectral coefficients having the form W(n)=a+ib, that is for (bins) n=1 ...

$$\frac{N_{FFT}}{2} - 1,$$

the absolute of the real and imaginary parts first needs to be found in block 503:

$$a_{abs} = \text{abs}(a)$$

$$b_{abs} = \text{abs}(b) \quad (2)$$

Next, in block 505, the larger and smaller absolute values may be identified:

$$\text{MAX}_{ab} = \max(a_{abs}, b_{abs})$$

$$\text{MIN}_{ab} = \min(a_{abs}, b_{abs}) \quad (3)$$

When the larger and smaller values are known, the magnitude approximation may be calculated as a linear combination of the two in blocks 507 and 509:

$$M = \begin{cases} 0.99 \text{ MAX}_{ab} + \\ 0.197 \text{ MIN}_{ab}, & \text{MIN}_{ab} < 0.4142135 \text{ MAX}_{ab} \\ 0.84 \text{ MAX}_{ab} + \\ 0.561 \text{ MIN}_{ab}, & \text{otherwise} \end{cases} \quad (4)$$

FIG. 5 is a flowchart of square root free linear approximation of magnitude spectrum, with complex input X(n)=a+ib, and which may be performed once for each spectral bin.

Figure 6:
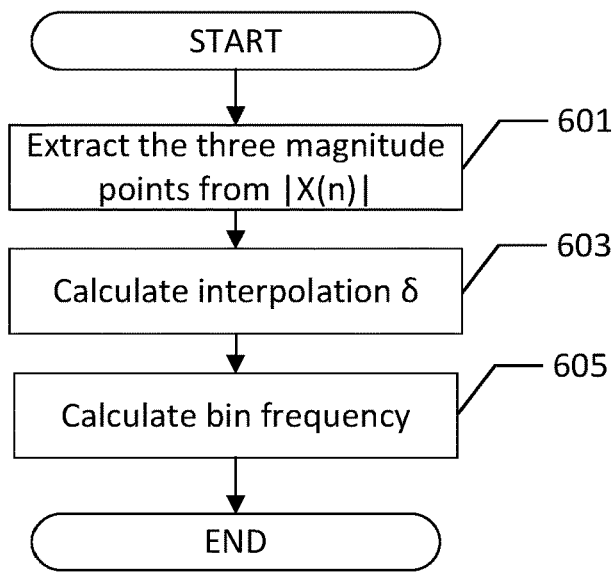
FIG. 6 is a flowchart for fractional frequency interpolation.

With an operation for frequency estimation discussed in international patent publication no. WO2014/123469A1, the coarse frequency estimation is the bin where the tone is located. For example, with one tone that is located at bin k, with exception of the special treatment at the endpoints. Turning to FIG. 6, the spectral estimate may use the bins k−1, k, k+1, their spectral magnitude may be extracted in block 601 and input to an interpolation unit that may calculate an interpolation δ in block 603 and the fractional bin offset in block 605, usually is in the range δ=[−0.5,0.5], based on the input. FIG. 6 is a flowchart of such a process for the above operations for fractional frequency interpolation, which may be performed once for each tone found by the tone locator.

Figure 7:
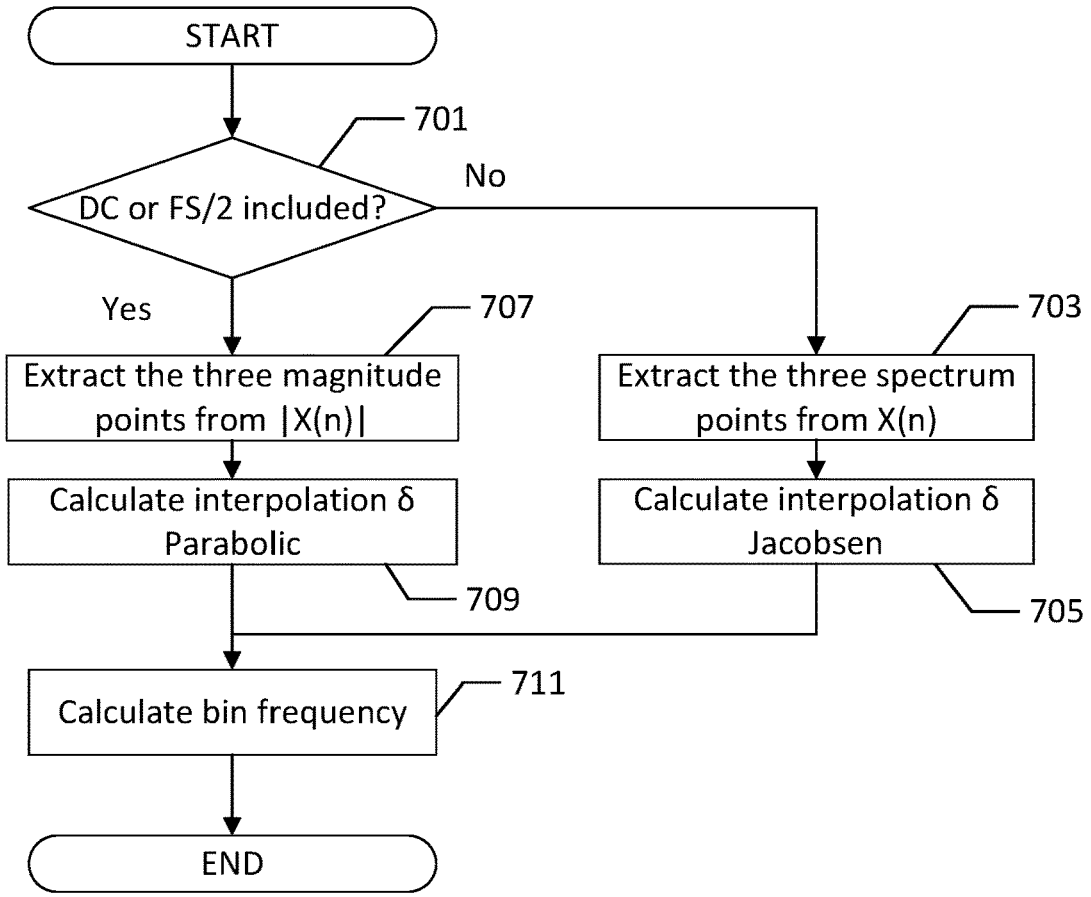
FIG. 7 is a flowchart for fractional frequency interpolation in accordance with some embodiments of inventive concepts.

In some embodiments of inventive concepts, frequency interpolation may use a control unit to select which method is to be used for each located tone. FIG. 7 is a flowchart for fractional frequency interpolation, which may be performed once for each tone found by the tone locator in accordance with embodiments of inventive concepts. FIG. 7 is described in more detail as follows.

At block 701, if the tone is located so that the interpolation will use either the DC bin or the fs/2 bin the interpolation control unit uses a method using absolute values of bin data (blocks 707, 709, 711), see e.g., similar operations discussed in international patent publication no. WO2014/123469A1. Where the three consecutive spectral estimates extracted in block 707, for a tone at k, are the real magnitude spectra coefficients |X(n)|, n=k−1, k, k+1 are input to the interpolation current unit as $|X_{k-1}|$, $|X_k|$, and $|X_{k+1}|$. A calculation of the fractional offset is made similar to operations discussed international patent publication no. WO2014/123469A1 in block 709:

$$\delta = \frac{|X_{k+1}| - |X_{k-1}|}{4|X_k| - 2|X_{k-1}| - 2|X_{k+1}|}. \quad (5)$$

With special handling of the tone located at DC or FS/2, that is when the tone locator may indicate that the located tone may not be at the center of the provided data points.

In some embodiments of inventive concepts, if the tone is located so that the interpolation will not use either the DC bin or the fs/2 bin, the interpolation control unit uses a method adapted to the used window function and FFT length (blocks 703, 705, 711), with the FFT coefficients X(n), for n=0, . . . $N_{FFT}/2$ being the estimated spectrum. Similar operations are discussed in E Jacobsen and P Kootsooks, "Fast Accurate Frequency Estimation", IEEE Signal Processing Magazine, pp 123-125, May, 2007 (Jacobsen). While the interpolation using absolute values of bin data uses the magnitude spectrum, the complex spectrum is still saved and may be used for the reconstruction so there is no complexity or memory penalty. The interpolation may be made using the complex coefficients on three consecutive FFT bins where the center bin is the found tone location.

Since the complex representation of the spectrum is used there may be no accuracy penalty from using the magnitude approximation in calculating the magnitude spectrum for the tone locator. Only the endpoints would use those approximations.

With a tone at k, the complex-valued coefficients X (n), n=k−1, k, k+1 may be input to the interpolation unit as $X_{k-1}$, $X_k$, and $X_{k+1}$. The interpolation may calculate a fractional bin offset in block 711, usually in the range δ=[−0.5,0.5], based on the equation:

$$\delta = K_{jacob} \text{RE}\left\{\frac{X_{k-1} - X_{k+1}}{2X_k - X_{k-1} - X_{k+1}}\right\} \quad (6)$$

Where $K_{jacob}$ is a scaling coefficient that depends on the type of window used and the size of the FFT in relation to the sampling frequency. While the expression RE{ }, means that only the real part of the expression within the parenthesis is used as the result—that is δ will still be a real value even though the spectral coefficients used for input are complex. For less complexity, only the real part of the expression within the RE{ } may be calculated.

In both cases, to get the estimated frequency this fractional offset may be combined with the coarse resolution of the peak location k and the interpolation value δ.

$$f_k = (k+\delta)C \quad (7)$$

where the C is the coarse resolution (in Hz/bin) and depends on length of the FFT and the sampling frequency, fs. The coarse resolution, that is Hz/bin, is just $C=fs/N_{FFT}$.

Figure 1:
FIG. 1 illustrates a block diagram of using an audio encoder and an audio decoder over a network.
Figure 2:
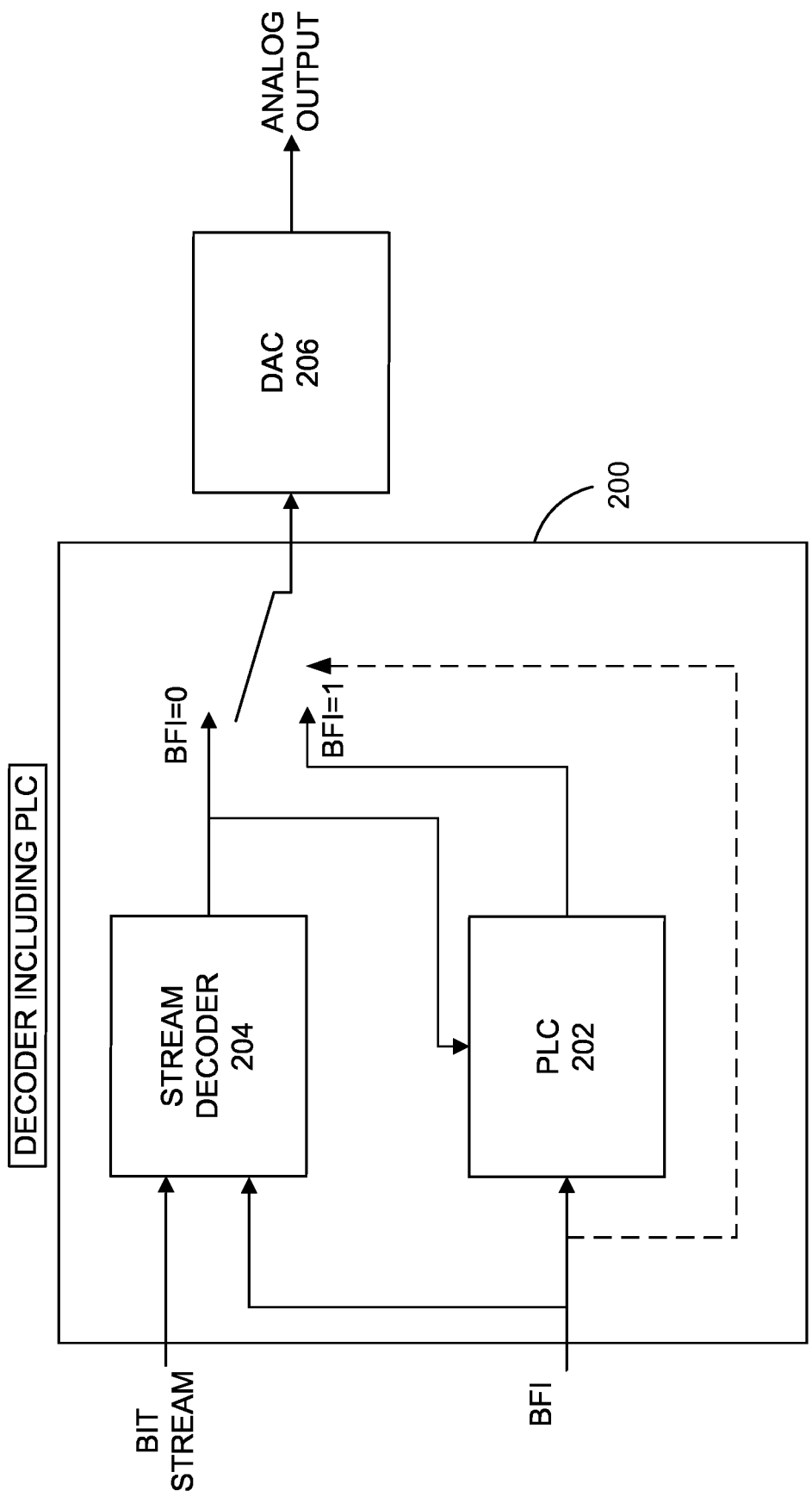
FIG. 2 illustrates a block diagram of a decoder including packet loss concealment.
Figure 3:
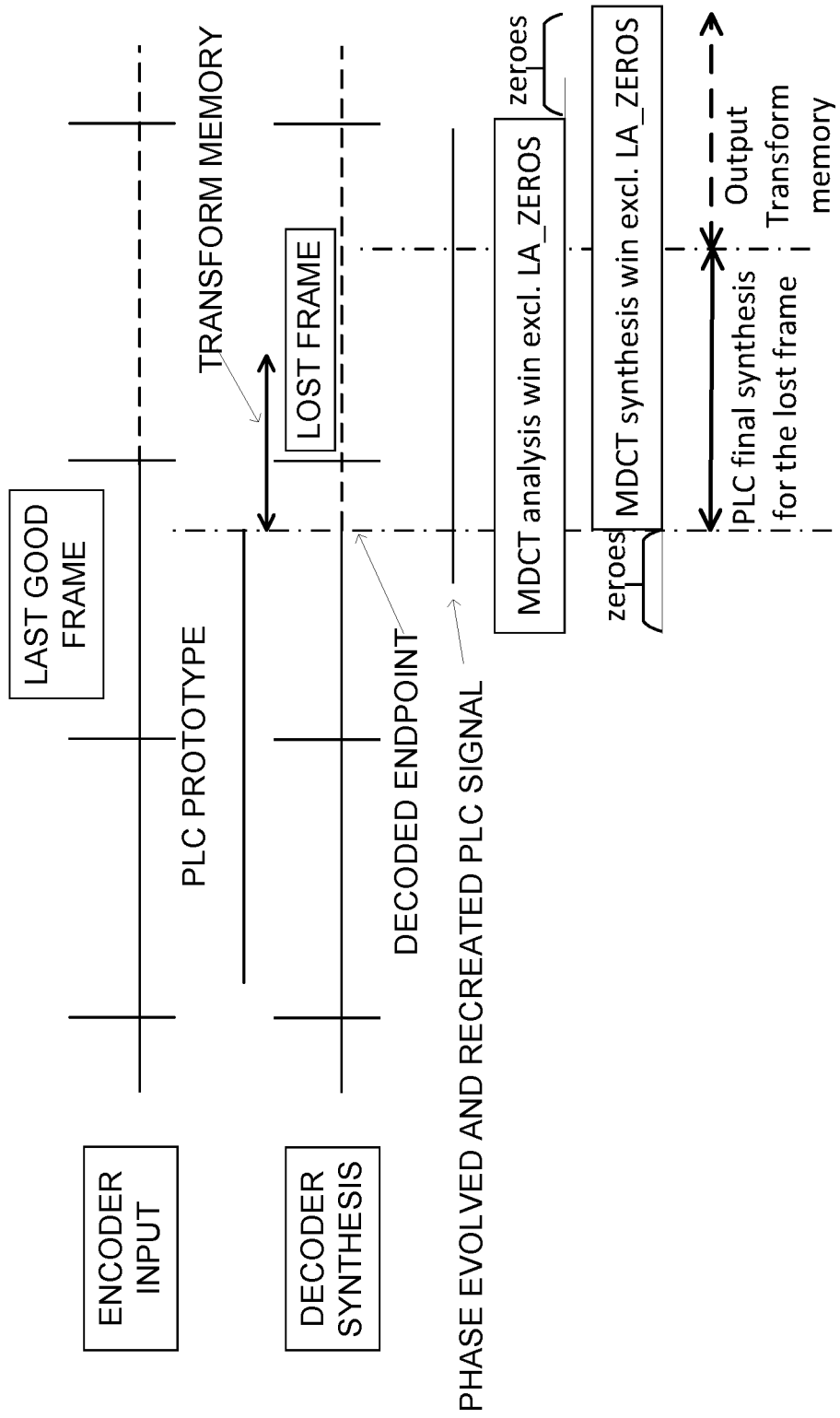
FIG. 3 illustrates a time alignment and signal diagram of Phase ECU and recreation of the signal from a PLC prototype.
Figure 4:
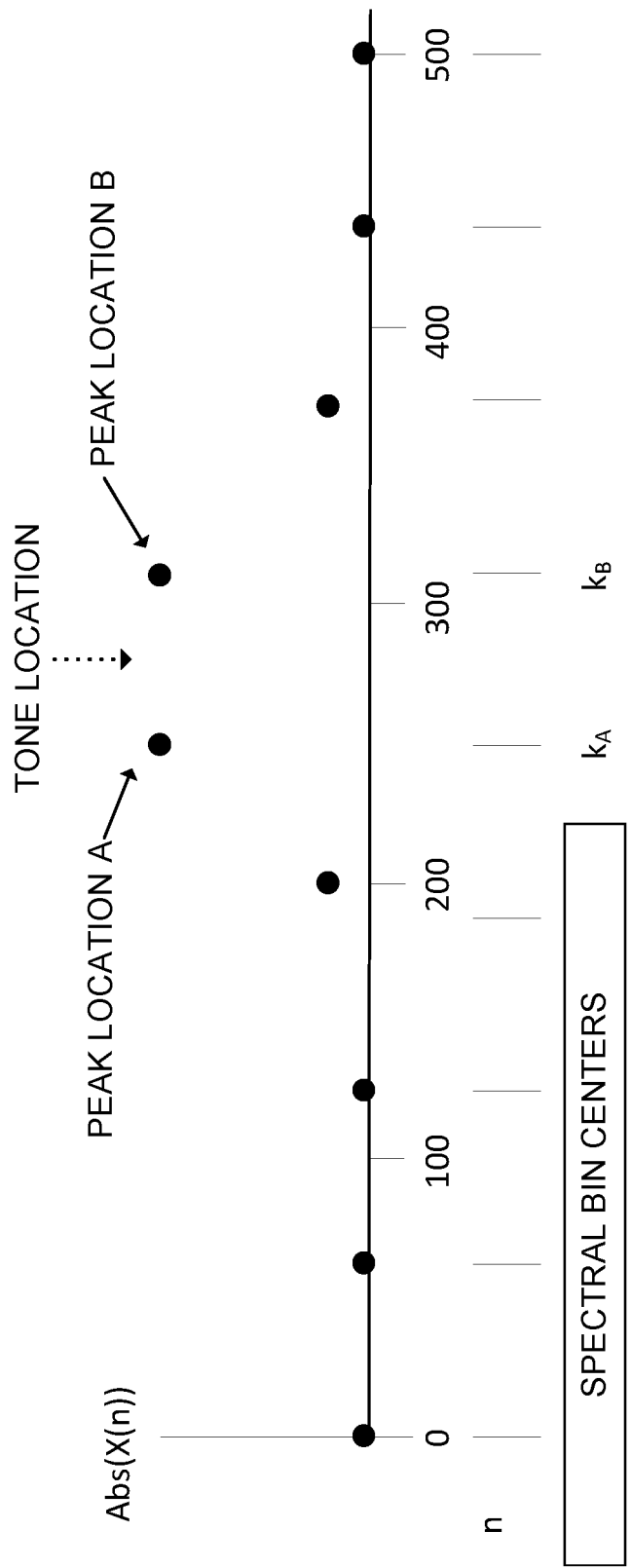
FIG. 4 illustrates a sampling magnitude spectrum.

While Jacobsen discusses $K_{jacob}$ (named Q in Jacobsen) values for some window types, Jacobsen does not include the window that is used in international patent publication no. WO2014/123469A1. In some embodiments, to derive the coefficient for that window, the case when a tone is in the middle between two bins may be used, that is δ=±0.5 depending on which peak is chosen, see e.g., FIG. 4. FIG. 4 illustrates a sample magnitude spectrum with one tone located in the middle between two spectral bins. Whether the tone location reports the coarse tone estimate to be $k_A$ or $k_B$ is a random event. In either case, the fractional interpolation should point to the same frequency estimated, which results in for that for $\delta_A \approx +0.5$ while $\delta_B \approx -0.5$. As the magnitudes for $k_A$ and $k_B$ are equally high, it may only be the phase of the tone, noise, or FFT accuracy that make them different, the tone location is equally likely to select any of them as the bin for the tone. So, while this does not provide the best min square error it may avoid an interpolation discontinuity at δ=±0.5.

Figure 8:
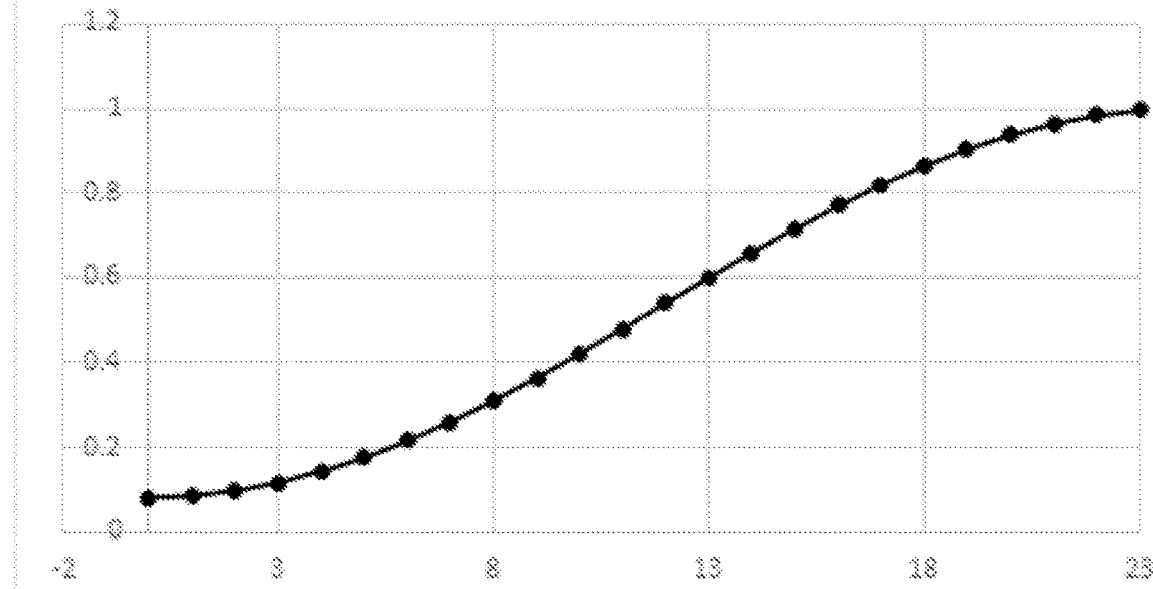
FIG. 8 illustrates a Hamm of the fadein of a 128 sample HammRect filter with fade length 24 in accordance with some embodiments of inventive concepts.
Figure 9:
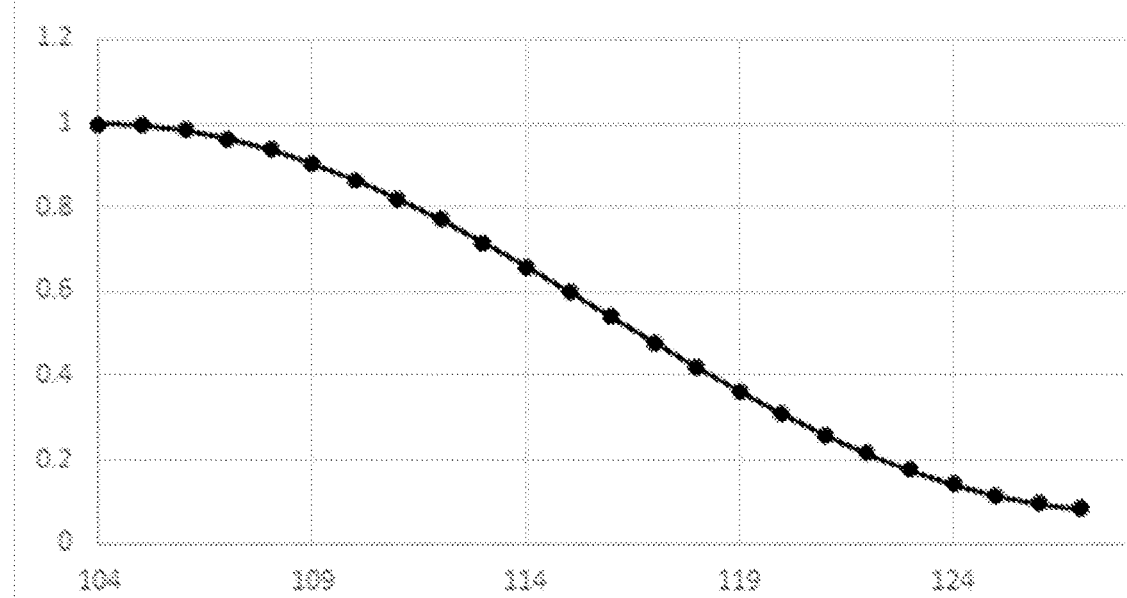
FIG. 9 illustrates a Hamm fadeout of a 128 samples HammRect filter with fade length 24 samples in accordance with some embodiments of inventive concepts.

The window used for spectral analysis in international patent publication no. WO2014/123469A1 is called a "HammRect-window" as it combines a rectangular window with tapering based on the Hamm window. For all sampling frequencies discussed in international patent publication no. WO2014/123469A1, the ratio of rectangular and tapering may be the same. In some embodiments, the window is defined as 3 ms fadein tapering, 10 ms rectangular, and 3 ms fadeout. The fadein and fadeout tapering for fs=8 kHz may be seen in FIGS. 8 and 9 respectively—the rectangular part would be located between the two and there would be 80 samples of 1.000. FIGS. 10 and 11 show fading and rectangular lengths as a function of different sampling frequencies. FIG. 10 illustrates that length of a copy part depends on the sampling frequency in accordance with some embodiments of inventive concepts. FIG. 11 illustrates that length of a hamming part depends on the sample frequency in accordance with some embodiments of inventive concepts.

With this type of window, the value of $K_{jacob}=1.1429$ would be the same for all sampling frequencies. If one uses a symmetric Hamm window for the tapering, one needs to use different values for different sampling frequencies, the difference is small. Some examples are: FFT size 128→1.1476, 256→1.1452, 512→1.1440, and 768→1.1436. Using one fixed coefficient and a periodic Hamm window may avoid this. The definition for a periodic Hamm window is:

$$Hamm(n) = 0.54 - 0.46\cos\left(\frac{2\pi n}{L+1}\right), n = 0, \ldots L \quad (8)$$

To generate the tapering sections, it is evaluated with L=2 $L_{fade}$, after evaluation the first half of this window is the fadein part and the second half is the fadeout part.

One approach to tell if a Hamm window is symmetric or periodic is that it in the case that the first and last sample in the window is 0.08, it is symmetric. While if 0.08 is added to the sample to the periodic window it becomes symmetric but with the length L+1. From a storage point of view, the periodic definition allows for sub sampling—that is from a 32 kHz window one can sub sample that to get the 16 kHz and 8 kHz windows.

For the parabolic interpolation discussed in international patent publication no. WO2014/123469A1, there is no constant and it does not depend on the symmetric or periodic Hamm function.

Operations of decoder 1300 will now be discussed with reference to the flow charts of FIG. 12 according to some embodiments of inventive concepts. For example, modules may be stored in memory 1308 of FIGS. 13-15, and these modules may provide instructions so that when the instructions of a module are executed by processor 1306, processor 1306 performs respective operations of the respective flow chart.

Figure 12:
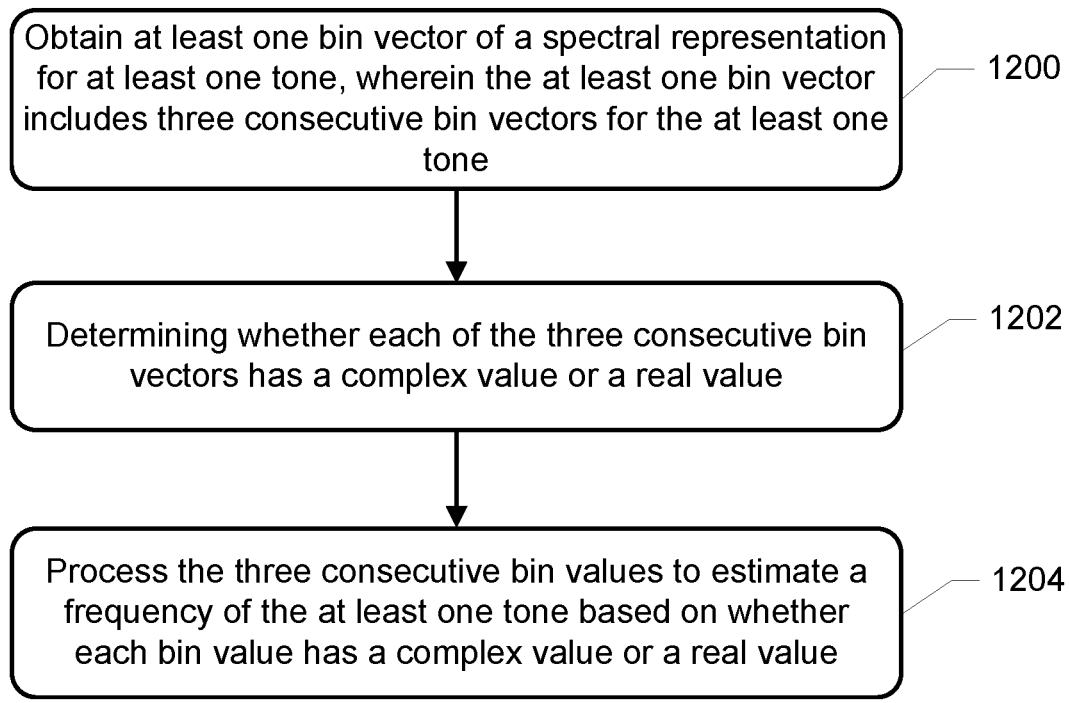
FIG. 12 is a flowchart illustrating controller operations according to some embodiments of inventive concepts.

FIG. 12 illustrates operations of controller 1306 of decoder 1300 for controlling a concealment method for a lost audio frame associated with a received audio signal.

At block 1200 of FIG. 12, processor 1306 of decoder 1300 obtains at least one bin vector of a spectral representation for at least one tone, wherein the at least one bin vector includes three consecutive bin values for the at least one tone. At block 1202, processor 1306 of decoder 1300 determines whether each of the three consecutive bin vectors has a complex value or a real value. At block 1204, processor 1306 of decoder 1300 may, responsive to the determination, process the three consecutive bin values to estimate a frequency of the at least one tone based on whether each bin value has a complex value or a real value.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

Abbreviation Explanation

ADC Analog to Digital Converter
BFI Bad Frame Indicator
DAC Digital to Analog Converter
FFT Fast Fourier Transform
IFFT Inverse Fast Fourier Transform
ITDA Inverse Time Domain Aliasing
LA_ZEROS Look Ahead Zeros
MDCT Modified Discrete Cosine Transform
OLA OverLap and Add
TDA Time Domain Aliasing

REFERENCES

[1] International patent publication no. WO2014/123469A1
[2] M Allie and R Lyons, "A Root of Less Evil", IEEE Signal Processing Magazine, pp 93-96, Marsh, 2005
[3] E Jacobsen and P Kootsooks, "Fast Accurate Frequency Estimation", IEEE Signal Processing Magazine, pp 123-125, May, 2007
[4] International patent publication no. WO2014/123471A1

Further discussion of inventive concepts is provided in the document International Patent Application Publication No. WO2014/123469A1.

Listing of Example Embodiments of Inventive Concepts

Example Embodiments are discussed below. Reference numbers/letters are provided in parenthesis by way of example/illustration without limiting example embodiments to particular elements indicated by reference numbers/letters.

1. A method for controlling a concealment method for a lost audio frame of a received audio signal, the method comprising:
receiving (1200, 1312) a plurality of bin vectors of a spectral representation for at least one tone, wherein the plurality of bin vectors include three consecutive bin vectors for the at least one tone;
determining (1202, 1314) whether each of the three consecutive bin vectors has a complex value or a real value;
responsive to the determination, processing (1204, 1316) the three consecutive bin values to estimate a frequency of the at least one tone.

2. The method of Embodiment 1, wherein determining comprises determining that each of the three consecutive bin vectors for the at least one tone has a complex value, and wherein processing comprises extracting a complex value coefficient for each of the three consecutive bin vectors; calculating (1204, 1314) a fractional bin offset for the at least one tone based on the complex valued coefficients for each of the three consecutive bin vectors; and calculating (1204, 1314) a bin frequency for the at least one tone based on the fractional bin offset.

3. The method of any of Embodiments 1 to 2, wherein calculating the fractional bin offset for the at least one tone comprises a scaling coefficient, a window function used for the spectral representation, and a transform length for a frequency spectrum containing each of the three consecutive bin vectors for the at least one tone.

4. The method of any of Embodiments 1 to 3, wherein the scaling coefficient depends on a type of window function.

5. The method of any of Embodiments 1 to 4, wherein calculating the factional bin offset for the at least one tone comprises a window function and a transform length for a frequency spectrum containing each of the three consecutive bin vectors.

6. The method of any of Embodiments 1 to 5, wherein the window function comprises a combined rectangular window with tapering based on a Hamm window.

7. The method of any of Embodiments 1 to 6, wherein the rectangular window includes rectangular lengths and the Hamm window includes fading lengths.

8. The method of any of Embodiments 1 to 7, wherein each of the rectangular lengths and the fading lengths depend on at least one sampling frequency.

9. The method of any of Embodiments 1 to 18, wherein the scaling coefficient comprises a constant when the window function comprises a combined rectangular window with tapering based on a Hamm window.

10. The method of any of Embodiments 1 to 9, wherein the window function comprises a periodic Hamm window.

11. The method of any of Embodiments 1 to 10, wherein the scaling coefficient comprises a constant when the window function comprises a periodic Hamm window.

12. The method of any of Embodiments 1 to 11, wherein calculating a bin frequency for the at least one tone comprises the fractional bin offset for the at least one tone, the location of the at least one tone in the first bin of the three consecutive bins, and a coarse resolution in Hz/bin.

13. The method of any of Embodiments 1 to 12, wherein the coarse resolution depends on a transform length for the frequency spectrum and a sampling frequency.

14. The method of any of Embodiments 1 to 13, wherein determining and processing are performed for each of the at least one tone of the spectral representation.

15. The method of Embodiment 1, wherein determining comprises determining that at least one of the three consecutive bin vectors has a real value, and wherein processing comprises extracting a magnitude point for each of the three consecutive bin vectors; calculating a fractional bin offset based on the magnitude points for each of the three consecutive bin vectors; and calculating a bin frequency for the at least one tone based on the fractional bin offset.

16. A decoder (1300) for controlling a concealment method for a lost audio frame of a received audio signal, the decoder comprising:

a processor (1306); and memory (1308) coupled with the processor, wherein the memory includes instructions that when executed by the processor causes the decoder to perform operations according to any of Embodiments 1-15.

17. A decoder (1300) for controlling a concealment method for a lost audio frame of a received audio signal, wherein the decoder is adapted to perform according to any of Embodiments 1-15.

18. A computer program comprising program code to be executed by at least one processor (1306) of a decoder (1300) for controlling a concealment method for a lost audio frame of a received audio signal, whereby execution of the program code causes the decoder (1300) to perform operations according to any one of embodiments 1-15.

19. A computer program product comprising a non-transitory storage medium including program code to be executed by at least one processor (1306) of a decoder (1300) for controlling a concealment method for a lost audio frame of a received audio signal, whereby execution of the program code causes the decoder (1300) to perform operations according to any one of embodiments 1-15.

ADDITIONAL EXPLANATION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for controlling a concealment method for a lost audio frame associated with a received audio signal, the method comprising:
    obtaining at least one bin vector of a spectral representation for at least one tone, wherein the at least one bin vector includes three consecutive bin values for the at least one tone; and
    responsive to whether each of the three consecutive bin values has a complex value or a real value, selecting an interpolation method to estimate a frequency of the at least one tone using the three consecutive bin values.

2. The method of claim 1, wherein when each of the three consecutive bin values for the at least one tone has a complex value:
    extracting a complex value coefficient for each of the three consecutive bin values;
    calculating a fractional bin offset for the at least one tone based on the complex valued coefficient of each of the three consecutive bin values; and
    calculating a bin frequency for the at least one tone based on the fractional bin offset.

3. The method of claim 2, wherein calculating the fractional bin offset for the at least one tone comprises calculating the fractional bin offset for the at least one tone based a scaling coefficient, a window function used for the spectral representation, and a transform length for a frequency spectrum containing each of the three consecutive bin values for the at least one tone.

4. The method of claim 3, wherein the scaling coefficient depends on a type of window function.

5. The method of claim 2, wherein calculating the fractional bin offset for the at least one tone comprises calculating the fractional bin offset for the at least one tone based on a window function and a transform length for a frequency spectrum containing each of the three consecutive bin values.

6. The method of claim 5, wherein calculating the fractional bin offset comprises calculating the fractional bin offset according to:

$$f_k = (k+\delta)C$$

wherein $f_k$ is the fractional bin offset for peak location k, $\delta$ is an interpolation value, and C is a coarse resolution in Hz/bin.

7. The method of claim 6 wherein $\delta$ is determined according to:

$$\delta = K_{jacob} \text{RE}\left\{\frac{X_{k-1} - X_{k+1}}{2X_k - X_{k-1} - X_{k+1}}\right\}$$

where $K_{jacob}$ is a scaling coefficient and $X_{k-1}$, $X_k$, and $X_{k+1}$ are complex-valued coefficients for the at least one tone at k.

8. The method of claim 1, further comprising when at least one of the three consecutive bin values has a real value:
    extracting a magnitude point for each of the three consecutive bin values;

calculating a fractional bin offset based on the magnitude points for each of the three consecutive bin values; and calculating a bin frequency for the at least one tone based on the fractional bin offset.

9. An apparatus for controlling a concealment method for a lost audio frame associated with a received audio signal, the apparatus comprising:

processing circuitry; and memory coupled with the processing circuitry, wherein the memory includes instructions that when executed by the processing circuitry causes the apparatus to perform operations comprising:

obtaining at least one bin vector of a spectral representation for at least one tone, wherein the at least one bin vector includes three consecutive bin values for the at least one tone; and responsive to whether each of the three consecutive bin values has a complex value or a real value, selecting an interpolation method to estimate a frequency of the at least one tone using the three consecutive bin values.

10. The apparatus of claim 9 wherein the memory includes further instructions that when executed by the processing circuitry causes the apparatus to perform operations comprising:

when each of the three consecutive bin values for the at least one tone has a complex value:

extracting a complex value coefficient for each of the three consecutive bin values;

calculating a fractional bin offset for the at least one tone based on the complex valued coefficient of each of the three consecutive bin values; and calculating a bin frequency for the at least one tone based on the fractional bin offset.

11. The apparatus according to claim 10, wherein in calculating the fractional bin offset for the at least one tone, the memory includes further instructions that when executed by the processing circuitry causes the apparatus to perform operations comprising:

calculating the fractional bin offset for the at least one tone based a scaling coefficient, a window function used for the spectral representation, and a transform length for a frequency spectrum containing each of the three consecutive bin values for the at least one tone.

12. The apparatus of claim 11, wherein the scaling coefficient depends on a type of window function.

13. The apparatus of claim 10, wherein calculating the fractional bin offset for the at least one tone, the memory includes further instructions that when executed by the processing circuitry causes the apparatus to perform operations comprising:

calculating the fractional bin offset for the at least one tone based on a window function and a transform length for a frequency spectrum containing each of the three consecutive bin values.

14. The apparatus of claim 13, wherein calculating the fractional bin offset comprises calculating the fractional bin offset according to:

$$f_k = (k+\delta)C$$

wherein $f_k$ is the fractional bin offset for peak location k, $\delta$ is an interpolation value, and C is a coarse resolution in Hz/bin.

15. The apparatus of claim 14 wherein $\delta$ is determined according to:

$$\delta = K_{jacob} \text{RE}\left\{\frac{X_{k-1} - X_{k+1}}{2X_k - X_{k-1} - X_{k+1}}\right\}$$

where $K_{jacob}$ is a scaling coefficient and $X_{k-1}$, $X_k$, and $X_{k+1}$ are complex-valued coefficients for the at least one tone at k.

16. The apparatus of claim 9, wherein the memory includes further instructions that when executed by the processing circuitry causes the apparatus to perform operations further comprising:

when at least one of the three consecutive bin values has a real value:

extracting a magnitude point for each of the three consecutive bin values;

calculating a fractional bin offset based on the magnitude points for each of the three consecutive bin values; and calculating a bin frequency for the at least one tone based on the fractional bin offset.

17. A non-transitory computer readable medium having program code to be executed by at least one processor of a decoder for controlling a concealment method for a lost audio frame associated with a received audio signal, whereby execution of the program code causes the decoder to perform operations comprising:

obtaining at least one bin vector of a spectral representation for at least one tone, wherein the at least one bin vector includes three consecutive bin values for the at least one tone; and responsive to whether each of the three consecutive bin values has a complex value or a real value, selecting an interpolation method to estimate a frequency of the at least one tone using the three consecutive bin values.

18. The non-transitory computer readable medium of claim 17, having further program code to be executed by the at least one processor, whereby execution of the further program code causes the decoder to perform operations comprising:

wherein when each of the three consecutive bin values for the at least one tone has a complex value:

extracting a complex value coefficient for each of the three consecutive bin values;

calculating a fractional bin offset for the at least one tone based on the complex valued coefficient of each of the three consecutive bin values; and calculating a bin frequency for the at least one tone based on the fractional bin offset.

19. The non-transitory computer readable medium of claim 18, wherein calculating the fractional bin offset for the at least one tone comprises calculating the fractional bin offset for the at least one tone based a scaling coefficient, a window function used for the spectral representation, and a transform length for a frequency spectrum containing each of the three consecutive bin values for the at least one tone.

20. The non-transitory computer readable medium of claim 17 having further program code to be executed by at least one processor of a decoder for controlling a concealment method for a lost audio frame associated with a received audio signal, whereby execution of the further program code causes the decoder to perform operations comprising:

when at least one of the three consecutive bin values has a real value:
  extracting a magnitude point for each of the three consecutive bin values;
  calculating a fractional bin offset based on the magnitude points for each of the three consecutive bin values; and
  calculating a bin frequency for the at least one tone based on the fractional bin offset.

* * * * *